United States Patent
Wieczorek et al.

(10) Patent No.: US 9,760,364 B2
(45) Date of Patent: *Sep. 12, 2017

(54) CHECKS FOR SOFTWARE EXTENSIONS

(71) Applicant: SAP SE, Walldorf (DE)

(72) Inventors: Thomas Wieczorek, Meckesheim (DE); Kai Dehmann, Baden-Wuerttemberg (DE); Tamara Weckwerth, St. Leon Rot (DE)

(73) Assignee: SAP SE, Walldorf (DE)

( * ) Notice: Subject to any disclaimer, the term of this patent is extended or adjusted under 35 U.S.C. 154(b) by 335 days.

This patent is subject to a terminal disclaimer.

(21) Appl. No.: 14/713,479

(22) Filed: May 15, 2015

(65) Prior Publication Data
US 2016/0335068 A1    Nov. 17, 2016

(51) Int. Cl.
G06F 9/44    (2006.01)
G06F 9/445    (2006.01)
G06F 11/36    (2006.01)

(52) U.S. Cl.
CPC .......... *G06F 8/65* (2013.01); *G06F 8/61* (2013.01); *G06F 8/63* (2013.01); *G06F 11/3684* (2013.01); *G06F 11/3688* (2013.01)

(58) Field of Classification Search
CPC ....................................................... G06F 9/44
USPC ............................................... 717/168–173
See application file for complete search history.

(56) References Cited

U.S. PATENT DOCUMENTS

| | | | |
|---|---|---|---|
| 7,827,548 B1 | 11/2010 | Anderson et al. | |
| 2002/0055928 A1 | 5/2002 | Worthington | |
| 2004/0225952 A1* | 11/2004 | Brown | G06F 8/20 714/819 |
| 2005/0289536 A1* | 12/2005 | Nayak | G06F 8/61 717/174 |
| 2009/0288078 A1* | 11/2009 | Makonahalli | G06F 8/60 717/174 |
| 2010/0042661 A1* | 2/2010 | Lee | G06F 8/70 707/E17.007 |
| 2015/0128112 A1 | 5/2015 | Choi | |

* cited by examiner

*Primary Examiner* — Jae Jeon
(74) *Attorney, Agent, or Firm* — Schwegman Lundberg & Woessner, P.A.

(57) ABSTRACT

Software extensions for applications of an enterprise system may be developed in a test system. An adaptation transport module accesses, in the test system, a collection of adaptation objects where each adaptation object includes a semantic representation of a software extension for an application of an enterprise system and at least one associated software object. The transport module processes the collection by: generating staging data based on a type of each adaptation object; exporting the collection from the test system; performing checks on each adaptation object based on the staging data; and importing the collection to the enterprise system. The transport module installs each of the software extensions on the application, using the at least one associated software object for each, based on the results of the checks of each respective adaptation object. The staging data may be written to a file in a common directory shared by both systems.

20 Claims, 8 Drawing Sheets

CHECKS FOR SOFTWARE EXTENSIONS

TECHNICAL FIELD

This document generally relates to methods and systems for processing (e.g., importing, installing, patching, etc.) extensions for software applications, for example, in order to extend the capabilities of or data available to an existing software application in a simple, safe and secure manner. More particularly, this document relates to providing a staging phase for software extensions (e.g., to perform certain checks) before they are deployed in a production environment.

BACKGROUND

With the growth of cloud computing, where remote servers allow for centralized data storage and online access to computer resources, users are adopting enterprise software in the cloud at an accelerating pace. The speed of innovation, ease of consumption, and low total cost of ownership associated with a cloud based enterprise solution will certainly continue to attract more enterprise customers. However, user development of software extensions for enterprise applications in a public cloud-based environment often includes little or no chance to test a software extension developed in a first (test) system just before it is imported to the second (enterprise) system. In standard "on the premises" development environments a quality system may be provided between the first (test) system and the second (enterprise) system in order to conduct meaningful tests in the quality system before importing any software changes to the second system. The lack of meaningful "implementation time" checks for software extensions in the public cloud may result in a high risk for the enterprise system if, for example, a first software extension is based on (and therefore requires) a second software extension and the first software extension is installed on an application of the enterprise system before the second software extension has been imported to the enterprise system. In this situation, the installation of the first software extension will fail and this failure may cause serious harm the enterprise system.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
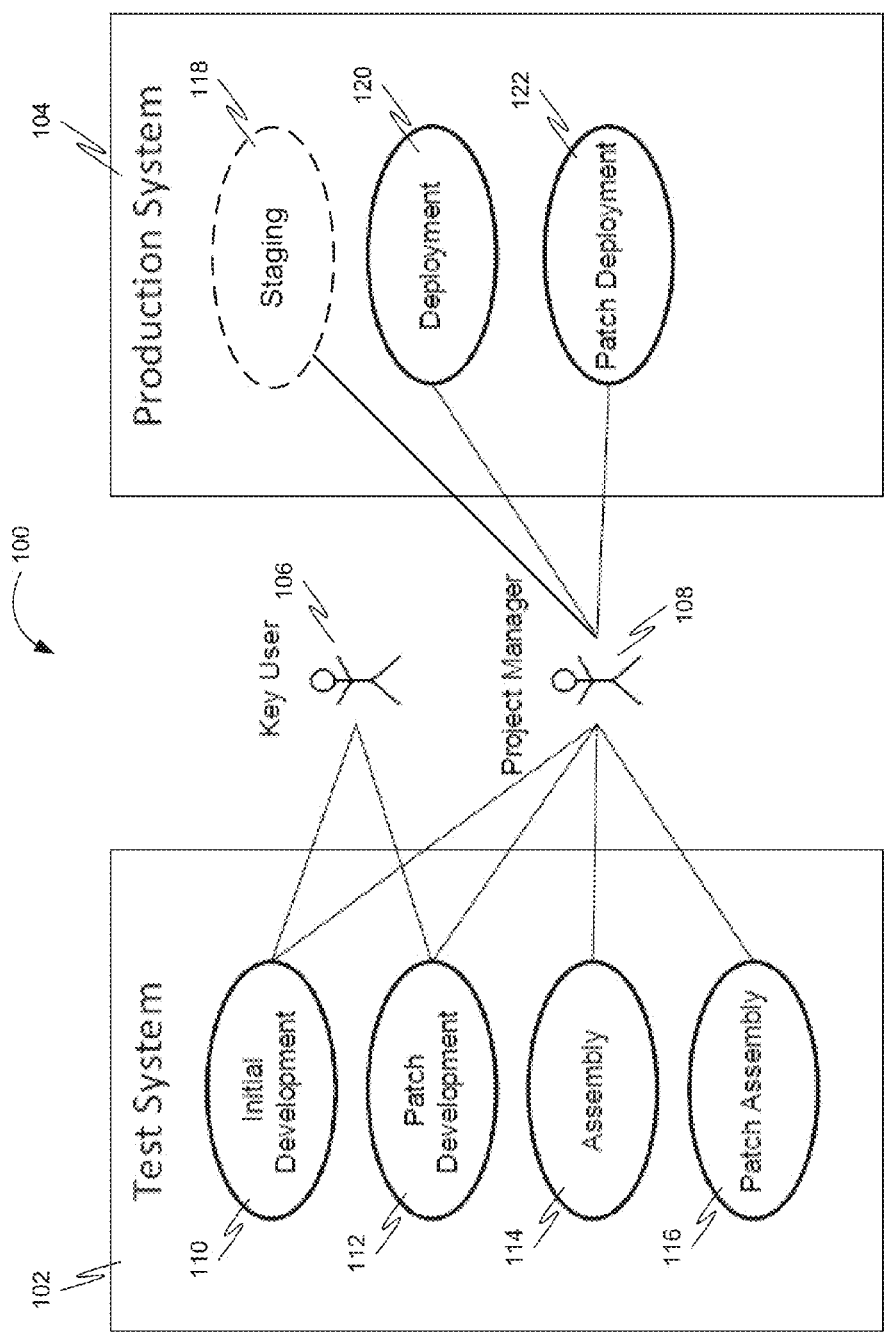
FIG. 1 is a use case diagram providing an overview of the systems and methods for developing, in a test system, software extensions for applications of a production system, in accordance with example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

For the purposes of this specification, example meaning of various term are provided below:

Production System: A production system includes, for example, an enterprise system used productively by business users.

Test System: A test system includes a system used to develop software extensions for applications of the production system.

Key User: A key user includes a developer of the extensions for software applications of the production system in the test system, e.g. by adding an additional field to an application screen in the test system.

Project Manager: A project manager transports the extensions between the test and production systems, e.g. by transporting the additional field extension developed by the key user from the test system to the production system.

Business User: A business user consumes the extended application in the production system, e.g. by entering values for the added field in the screen of the application in the production system.

Adaptation Item/Object: An adaptation object includes a semantic item that represents a single extension of an application of the production system. It is meaningful for and can be addressed by the key user, e.g. semantic descriptions like "new field extension" or "custom form". An adaptation item/object may consist of metadata and further transportable content—including technical objects—required for implementing the extension and/or required by the extended application at runtime.

Adaptation Type: Each adaptation item/object includes a specific adaptation type depending on the type of extension being represented.

Collection: A collection comprises multiple software extensions (including adaptation items and associated software objects) that have been grouped by the project manager for transport to the production system.

In an example embodiment, software extensions for applications of a production system (e.g., enterprise system) may be developed in a test system. A project manager accesses, in the test system, an adaptation object developed by a key user for an application in the production system, the adaptation object including a semantic representation of a software extension for the application (e.g., describing the software extension) and at least one associated software object (e.g., for implementing the software extension). The project manager processes the adaptation object by adding the adaptation object to a collection of associated adaptation objects. The test system then generates staging data based on an adaptation type of each of the adaptation objects of the collection (e.g., at export time) and assembles the technical objects associated with the adaptation objects (e.g., also at export time). Export time checks may be performed by the project manager on each of the adaptation objects (e.g., manually via a check button at export). The test system may then export the adaptation object along with any other adaptation objects grouped together in the collection. Importation time checks may also be performed (e.g., in the production system) on each of the adaptation objects based on the staging data before importing the adaptation object (along with any other adaptation objects grouped together in the collection) into the production system.

The project manager may then install the software extensions on the application in the production system, using the at least one associated software object for each extension, based on the results of the checks for each respective adaptation object. For example, checks may be performed and the results may then be compared against reference data associated with the respective adaptation types of each of the tested adaptation objects. The project manager may, for each failed check, be provided with a meaningful error message based on the semantic description of the software extension from the adaptation object that failed the test. The project manager may initiate the checks by, for example, accessing the staging data from a file stored in a designated transport directory shared by the test system and the production system.

In an example embodiment, the project manager may initiate the checks by, for example, accessing the staging data from a file in the production system. The project manager may perform checks on the adaptation object before it is imported into the production system. These checks may be performed by the project manager via an import button. The checks may be based on general test system data or data specific to the adaptation object (e.g., based on an adaptation type of the adaptation object), for example, checking if the installation of the software extension of a first adaptation object on the application of the enterprise system requires that the software extension of a second adaptation object be installed on the enterprise system application first.

FIG. 1 is a block diagram providing an overview 100 of the systems and methods described herein for developing, in a test system 102 by a key user 106, software extensions to be installed on applications of a production system 104 by a project manager 108, in accordance with example embodiments. In an initial development phase 110, the key user 106 creates adaptation objects including semantic representations of software extensions for adapting applications of the production system 104 to specific user requirements. The key user 106 develops the adaptation objects in the test system 102 so that the development of software extensions does not interrupt the operations of production system 104. In order to transport selected adaptation objects to the production system 104, the project manager 108 can group a set of adaptation objects (including associated software objects) into a collection. The project manager 108 may create the collection in the test system 102, e.g., by assigning adaptation objects to a collection from a list of unassigned adaptation objects.

In an assembly phase 114, the key user 106 has finished developing and testing their adaptation objects in the test system 102 and selected adaptation objects have been assigned to a collection by the project manager 108. The collection can now be exported from the test system 102 (for eventual transport to production system 104) and therefore the project manager 108 starts the assembly of the collection for transport. After a successful assembly (e.g., identification and collection of all needed technical objects) the collection can be exported from the test system 102 so that it is ready for deployment (e.g., importation) to the production system 104. The project manager 108 may review that status of the assembly in the test system 102 and, if the assembly of the collection for transport fails, a comprehensive list of error messages will be provided that is understandable and meaningful to the project manager 108, e.g., semantically significant error messages that do not refer to technical (e.g., software) objects and instead focus on the semantic representation of software extensions provided by the adaptation objects of the collection being assembled for transport.

After a successful assembly in the test system 102 the collection is exported from the test system. The import to the production system 104 starts with a staging phase 118 where the adaptation objects of the collection are subjected to a series of checks that may be performed in the production system 104. These checks may be performed based on staging data generated for the adaptation objects of the collection. The staging data may include general data, e.g. the release version of the test system 102 at the export time or data which is about specific adaptation objects, e.g. if an adaptation object needs other adaptation objects to be imported first in the production system 104. The general data can be accessed by the project manager 108 during the export and import processes (e.g., from the test system 102 and the production system 104), for the specific data regarding an adaptation object an adaptation type of the adaptation object may be a basis for generating staging data. For example, checks may be performed based on an adaptation type of the adaptation object and then the results may be compared against reference data associated with the respective adaptation types of each of the tested adaptation objects.

After a successful staging phase 118 (e.g., all checks have been passed) the collection is transported to the production system 104 in a deployment phase 120. The project manager 108 can decide when to deploy the collection to the production system 104, for example, the collection may be deployed immediately or at some scheduled point in time. The status of the deployment may be reviewed by the project manager 108 in the production system 104. As noted with respect to the assembly phase 114, if the deployment fails (e.g., a software extension could not be installed) a comprehensive list of error messages will be provided that is helpful and understandable to the project manager 108, e.g., free of unnecessary technical details. The project manager 108 may, for each failed check, be provided with a meaningful error message based on the semantic description of the software extension from the adaptation object that failed the test.

In a patch development phase 112, the key user 106 may develop changes (e.g., a patch) for transported (e.g., deployed) adaptation objects. These changes could include the creation of new adaptation objects that must be part of the collection, e.g., adaptation objects that depend on one another such as a custom form that includes a custom field. Changes made to adaptation objects that have already been deployed will automatically become part of the next export initiated by the project manager 108. Any other unassigned adaptation objects may be added to the collection by the project manager 108 in the manner described herein.

In a patch assembly phase 116, the key user 106 has finished creating/changing and testing adaptation objects in the test system 102 and the project manager 108 starts the assembly of the changed collection in the manner described herein. The project manager 108 then deploys the changes to the production system 104 in a patch deployment phase 122.

Figure 2:
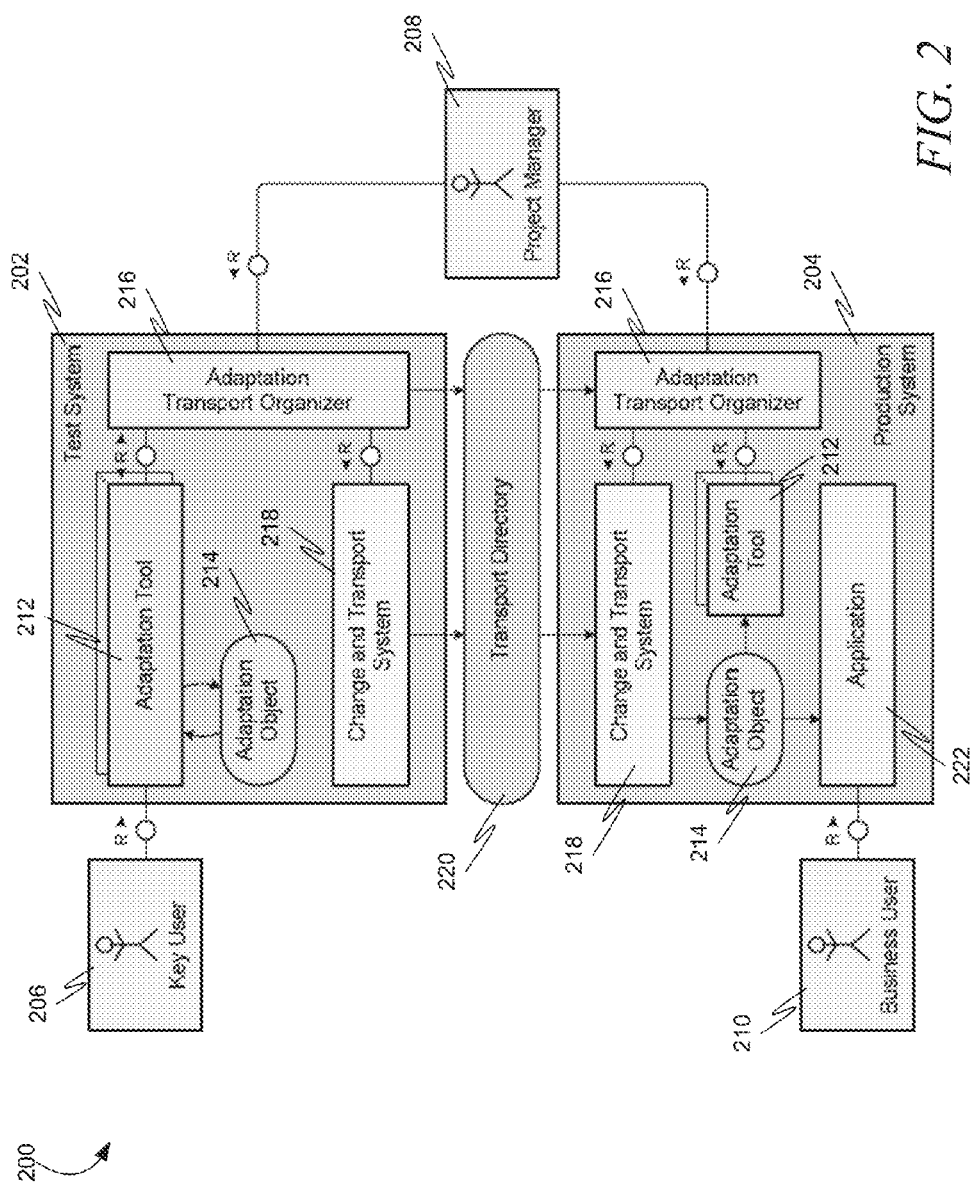
FIG. 2 is a block diagram illustrating a composite system for developing, in a test system, software extensions for applications of a production system, in accordance with example embodiments.

FIG. 2 is a block diagram illustrating a composite system for developing, in a test system 202, software extensions for applications of a production system 204, in accordance with example embodiments. The test system 202 can be a mirror of the production system 204 for the purpose of testing software extensions for applications of the production system 204. Therefore, the test system 202 may simply be copied from the production system 204. This test system 202 may also serve as a test bed for other updates to the production system 204, for example receiving such updates a couple of weeks before they are scheduled to be implemented in the production system 204. The production system 204 is copied from a master system (e.g., software vendor system). As updates are developed and tested in the test system 202, these updates are transported from the test system 202 to the production system. However, a transport from test system 202 to production system 204 may not be possible during the time between an update to test system 202 and the corresponding update to production system 204, since the test system 202 may contain an adaptation object 214 which does not yet exist in the production system 204. For this kind of maintenance activity, software logistics locks may be used so that transport is only possible if no software logistics lock is set, e.g., by a service provider.

In an embodiment, a clear distinction is made between customer objects and customer data created by key user 206 (e.g., adaptation object 214) and native system objects (e.g., from software developer/manufacturer), so that no native system objects are modified by the key user 206 and data is written only to either pure customer tables or to native system tables in designated customer parts of the test system 202 and production system 204. Therefore the upgrade (and hotfix) process will not delete customer objects or customer data created by key user 206 and no particular action is required (e.g., by key user 206 or project manager 208) during the upgrade or hotfix process.

In an embodiment, a change and transport system 218 for transporting changes developed in the test system 202 to the production system 204 is coupled to an adaptation transport organizer 216 that speaks "key user language" in order simplify the user experience for the key user 206. The adaptation transport organizer 216 may accomplish this by hiding development artifacts such as transport requests including list of technical objects (e.g., repository software objects) to be transported and instead presenting the key user 206 (and project manager 208) with a semantic description of the software being transported. As noted above, with respect to FIG. 1, the key user 206 adapts the system, e.g. by using an adaptation tool 212 to add an additional field to a screen in the test system 202. The project manager 208, using the adaptation transport organizer 216, transports the adaptations (e.g., adaptation object 214) between systems, e.g. by transporting a new field that was added to a standard form by key user 206 from test system 202 to production system 204. After the adaptation object 214 has been implemented in production system 204 (e.g., installed on application 222), a business user 210 may consume the adapted production system 204, e.g. by entering values for the added field in the application 222.

As noted above, the test system 202 is used by the key user 206 for adapting and testing while the production system 204 is used productively by business user 210. The change and transport system 218 transports the changes (e.g. adaptation object 214) between the test system 202 and the production system 204 in the system landscape of FIG. 2. The change and transport system 218 may require a special file structure for transport data, logs, temporary data, and transport control data. Therefore, in order to run automatically, the change and transport system 218 can use a transport directory 220 that can be shared by the test system 202 and the production system 204 to store and/or access such data.

Adaptation object 214 represents a single adaptation of the system. As noted above, the adaptation object is meaningful for and can be addressed by key user 206 and project manager 208, e.g. "field extension" or "custom form". The adaptation object 214 consists of metadata and further transportable content—including repository objects—that are required for its implementation in the production system 204 and/or required by the adapted (e.g., extended) application 222 at runtime. Adaptation object 214 may refer to other adaptation objects, for instance, a custom print form may use a custom field. Adaptation tool 212 is, for instance, an editor or wizard that is used by key user 206 to create adaptation object 214. As shown in FIG. 2, multiple adaptation tools 212 may be present, for instance, to add additional fields to a business object or create a new e-mail template. Adaptation tool 212 generates and administers the transportable content (e.g., software objects) of the adaptation object 214. However, the key user 206 does not need to provide (or even understand) any technical adaptation transport-related information when creating/editing an adaptation object 214—this is done by the adaptation tool 212 automatically. The adaptation tool 212 registers the adaptation objects 214 in the adaptation transport organizer 216 which in turn provides the technical information to the adaptation tool 212.

In an embodiment, the adaptation transport organizer 216 provides an overview of all adaptation objects 214 and is used by project manager 208 for transporting the adaptation objects 214 from test system 202 to production system 204. The adaptation transport organizer 216 creates and administers the packages of technical objects/data and creates a transport request. It can utilize change and transport system 218 to transport the adaptation objects 214 from test system 202 to production system 204, e.g., using the transport directory 220 to store the transport request including the adaptation objects 214. Additionally, the adaptation transport organizer 216 can writes its own staging data file to the transport directory 220. The staging data file is used to control the importation of adaptation objects and execute checks (e.g., during a staging phase 118) prior to implementing the adaptation objects 214 into the production system 204, for example, a version number check. Other staging data may be obtained from adaptation tool 212 based on data specific to each adaptation object 214, such as an adaptation type of the adaptation object 214. In an embodiment, data specific to each adaptation object 214 may be used to check if a transport request cannot be imported properly into production system 204 because one object of the transport request references another object that is neither on the transport request itself, nor has it previously been imported to the production system 204.

Figure 3:
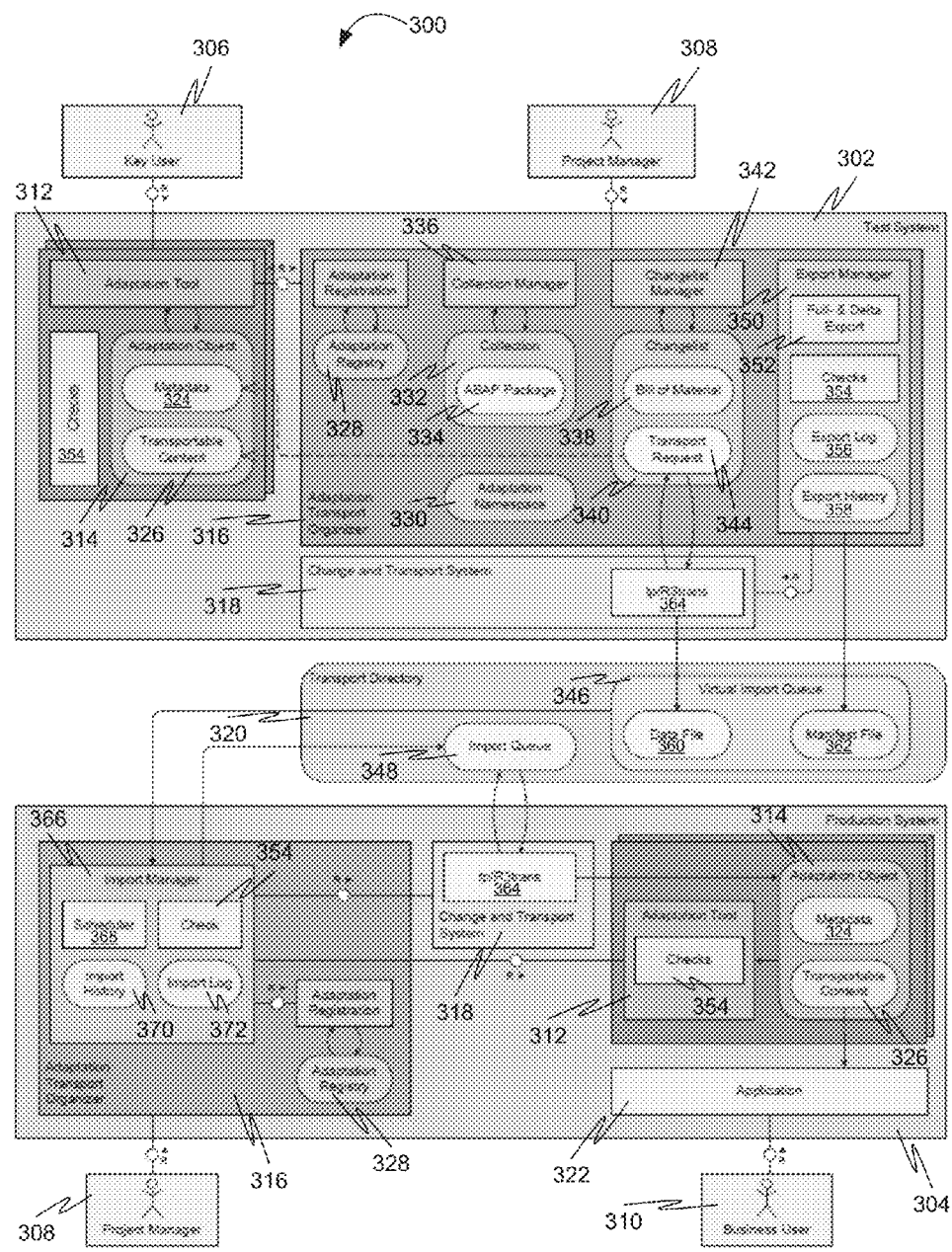
FIG. 3 is a block diagram illustrating, in more detail, a composite system for developing, in a test system, software extensions for applications of a production system, in accordance with example embodiments.

FIG. 3 is a block diagram illustrating, in more detail, a composite system 300 for developing, in a test system 302, software extensions for applications of a production system 304, in accordance with example embodiments. A key user 306 may use an adaptation tool 312 (there may be multiple adaptation tools 312 available) to generate and process the metadata 324 (e.g., semantic descriptors) and transportable content 326 (e.g., software objects) of the adaptation object 314. The adaptation tool 312 registers the adaptation object 314 in the adaptation registry 328 of the adaptation transport organizer 316. The adaptation tool 312 uses adaptation namespace 330, e.g., a prefix provided at system setup to be used in naming user created adaptation objects 314. In this way, all adaptation objects 314 are located in the adaptation namespace 330. The adaptation tool 312 can use a known software packing method, for example an Advanced Business Application Programming (ABAP) package 334 to automatically package the technical objects (e.g., transportable content 326) required to implement the adaptation objects 314 that are designed by key users 306 and collected (via collection manager 336 of the adaptation transport organizer 316) in a collection 332 for import to production system 304 by project manager 308. The relevant information (e.g., which technical objects to package for implementing specific adaptation objects 314 of a collection 332) is provided by the adaptation transport organizer 316, which gets this information from the adaptation tool 312. The adaptation tool 312 can provide a bill of material 338 for each adaptation object 314, where the bill of material 338 comprises a list of all transportable content 326 per adaptation object 314.

The import manager 366 registers each adaptation object 314 (e.g., after performing checks 354) in the adaptation registry 328 in the production system 304. The adaptation registry 328 therefore offers a comprehensive overview over all adaptations (e.g., software extensions) of the system. The adaptation registry 328 also provides more detailed information for every adaptation object 314, such as current status (e.g., imported), version number of the collection 332, last change date and user, etc. for every adaptation object 314. The adaptation registry 328 also contains information regarding the test system 302 in which the adaptation object was created. The adaptation registry 328 can be updated in the test system 302 by the adaptation tool 312 whenever an adaptation object 314 is modified by a key user 306. For this purpose the adaptation tool 312 sends a notification to the adaptation transport organizer 316. The adaptation registry 328 is provided in language that is meaningful for the key user 306, e.g. free of technical jargon associated with the adaptation objects 314.

In an embodiment, each adaptation object 314 is assigned to a collection 332 by the project manager 308 using collection manager 336 of the adaptation transport organizer 316. A collection 332 may be designated as local or transportable by the project manager 308. Initially, adaptation objects 314 are automatically assigned to a local collection 332. At a later time the project manager 308 can change the assignment, e.g. from local to transportable so that the collection may be transported to production system 304. The project manager 308 may change collection assignments via adaptation transport organizer 316.

A collection 332 has a version number that is increased each time the collection 332 is exported to production system 304. In an embodiment, a changelist 340 is generated (via a changelist manager 342 of the adaptation transport organizer 316) when a collection 332 is exported. The changelist 340 contains the list of adaptation objects 314 to be exported with a corresponding bill of material 338 for each adaptation object 314. The bill of material 338 is provided by the adaptation tool 312 to the adaptation transport organizer 316. A changelist 340 can contain data regarding only changes that have been made to an adaptation object 314 by a key user 306 since the collection 332 was last exported (referred to herein as a delta changelist) or it can contain data regarding all of the adaptation objects 314 of a collection 332 (referred to herein as a full changelist). A transport request 344 to be processed by change and transport system 318 in order to transport the collection 332 is generated; however the transport request 344 does not know which of its transport objects (e.g., transportable content 326) belong to what adaptation object 314 of collection 332. Therefore, the bill of material 338 (e.g., stored in the changelist 340) is used to keep track of what transport object belongs to what adaptation object 314.

In an embodiment, each pair of test system 302 and production system 304 (of an enterprise customer) has its own transport directory 320 and the test system 302 and production system 304 are both connected to that transport directory 320. Alternate embodiments with separate transport directories for the test system 302 and the production system 304 are also possible. The transport directory 320 contains a virtual import queue 346 and an import queue 348 for the production system 304. A project manager 308 can export only the changes (since last export) of a collection 332 or the project manager 308 can export the entire collection 332. Based on the selection by project manager 308, the export manager 350 requests a bill of material 338 per adaptation object 314 from each adaptation type, e.g., type of software extension. After the changelist manager 342 creates a changelist 340 and a transport request 344 and fills them accordingly, the export manager 350 authorizes the export of the collection 332 (after performing checks 354) as a data file 360 (e.g., written to the transport directory 320) and adds the transport request 344 to the virtual import queue 346 using the change and transport system 318, i.e. via an automated transport program tp/R3trans 364.

Additionally, the export manager 350 creates a manifest file 362 that is also written to the transport directory 320. In the case of separate transport directories for each of the two systems 302 and 304, the manifest file 362 may be integrated to the standard data file 360 so that the data file 360 can be directly exported to a separate "transport directory" of production system 304). The manifest file 362 contains the relevant adaptation registry 328 information, the bill of material 338, and other metadata of the collection 336 such as a version number (e.g., staging data). The data in the manifest file 362 may also (or alternatively) be written to a file (e.g., in an internal table) in the adaptation transport organizer 316 in production system 304. The export history 358 of export manager 350 provides an overview of when, who, and what was exported from test system 302 to production system 304, as well as the status and the information regarding whether each export was a delta/full export 352. The export log 356 of export manager 350 is written for each export and can contain two levels of information, namely, a business log which is easy to understand for the project manager 308 and a technical log that is understandable by technical personnel (e.g., service provider) and is hidden for the other users of the system such as key user 306 and project manager 308.

The project manager 308 can import changes (e.g., collection 332 of adaptation objects 314) to production system 304 that have been previously exported from test system 302. The project manager 308 may use an import manager 366 of adaptation transport organizer 316 for this purpose. All of the exported files (e.g., data file 360) in the virtual import queue 346 might be offered for import to production system 304 by the project manager 308. However, not all of the files might be available, for example, a data file 360 for a collection 332 in version 4 might be offered for import, but if a full version 5 of the same collection 332 is later imported, then the lower version 4 of collection 332 would no longer be offered for import. Based on the data files 360 and manifest files 362 available in the transport directory 320, the project manager 308 can choose what collection 332 (including which version of the collection 332) is to be imported into production system 304. In an embodiment, the project manager 308 may schedule collections to be imported at a future time using a scheduler 368 of the import manager 366. In an embodiment, the adaptation transport organizer 316 may automatically import all delta exports of a collection 332 up to the version number selected by the project manager 308 while ensuring that these are imported to production system 304 in the same sequence they were exported from test system 302, e.g., based on the version of collection 332 and if the exported files contain a delta or full changelist 340.

Before the actual import of any files to production system 304, the import manager 366 can perform checks 354 (e.g., in a staging phase 118) based on the manifest file (e.g. release compatibility) and also based on adaptation tool-specific checks 354. For example, staging data used as a basis for testing adaptation objects 314 during a staging phase (e.g., 118) before importation may be obtained from adaptation tool 312 based on data specific to each adaptation object 314, such as an adaptation type of the adaptation object 314. If all of the checks 354 are successful, for example because the results of the checks conform to reference data associated with the respective adaptation types of each of the adaptation objects 314 of the collection 332, the transport request 344 (persisted in data file 360) is transferred to the actual import queue 348 of the production system 304. The adaptation registry 328 of the production system 304 is then updated, and the actual import of the data file 360 is triggered using the change and transport system 318, i.e. via program tp/R3trans 364. The import history 370 of import manager 366 provides an overview of when, who, and what was imported into production system 304 from test system 302. The import log 372 of import manager 366 is written for each import and can contain two levels of information, namely, a business log which is easy to understand for the project manager 308 and a technical log that is understandable by technical personnel (e.g., service provider) and is hidden for the other users of the system such as key user 306 and project manager 308.

In an embodiment, data specific to each adaptation object 314 may be used to check if a transport request 344 cannot be imported properly into production system 304 because one adaptation object 314 of the transport request 344 references another adaptation object 314 that is neither on the transport request 344 itself, nor has it previously been imported to the production system 304. Therefore, interdependency of adaptation objects 314 is an important consideration, because all interdependent adaptation objects 314 should be present at import time for the import to production system 304. For example, if an adaptation object 314 includes a form CUSTOMER_DATA that uses an enhancement field TELNO (e.g., based on an adaptation object 314 created by a key user 306) of a table CUSTOMER then form CUSTOMER_DATA depends on the enhancement field TELNO of the table CUSTOMER. This means either this enhancement field (TELNO of the table CUSTOMER) must be present in the production system 304 before the adaptation object 314 that includes the form CUSTOMER_DATA is imported or the enhancement field (TELNO of the table CUSTOMER) must be in the same collection 332 as the adaptation object 314 that includes the form CUSTOMER_DATA. See FIGS. 5A and 5B below for more details. Being present in the same collection 332 is sufficient because the adaptation transport organizer 316 will allow only full exports of the collection 332 or delta exports without skipping any intervening delta exports during import of the adaptation object 314 into production system 304.

In an embodiment, dependencies between adaptation objects can be determined based on the adaptation type of an adaptation object 314. For example, if the information that form CUSTOMER_DATA uses the enhancement field TELNO of the table CUSTOMER is just written in a table, technical means (e.g., a search) might not be able to find this data. Therefore the adaptation type of an adaptation object 314 may be the basis for the adaptation transport organizer 316 to look for data (e.g., call to a class of the adaptation type of the adaptation object 314) regarding any dependencies between adaptation objects 314.

Figure 4:
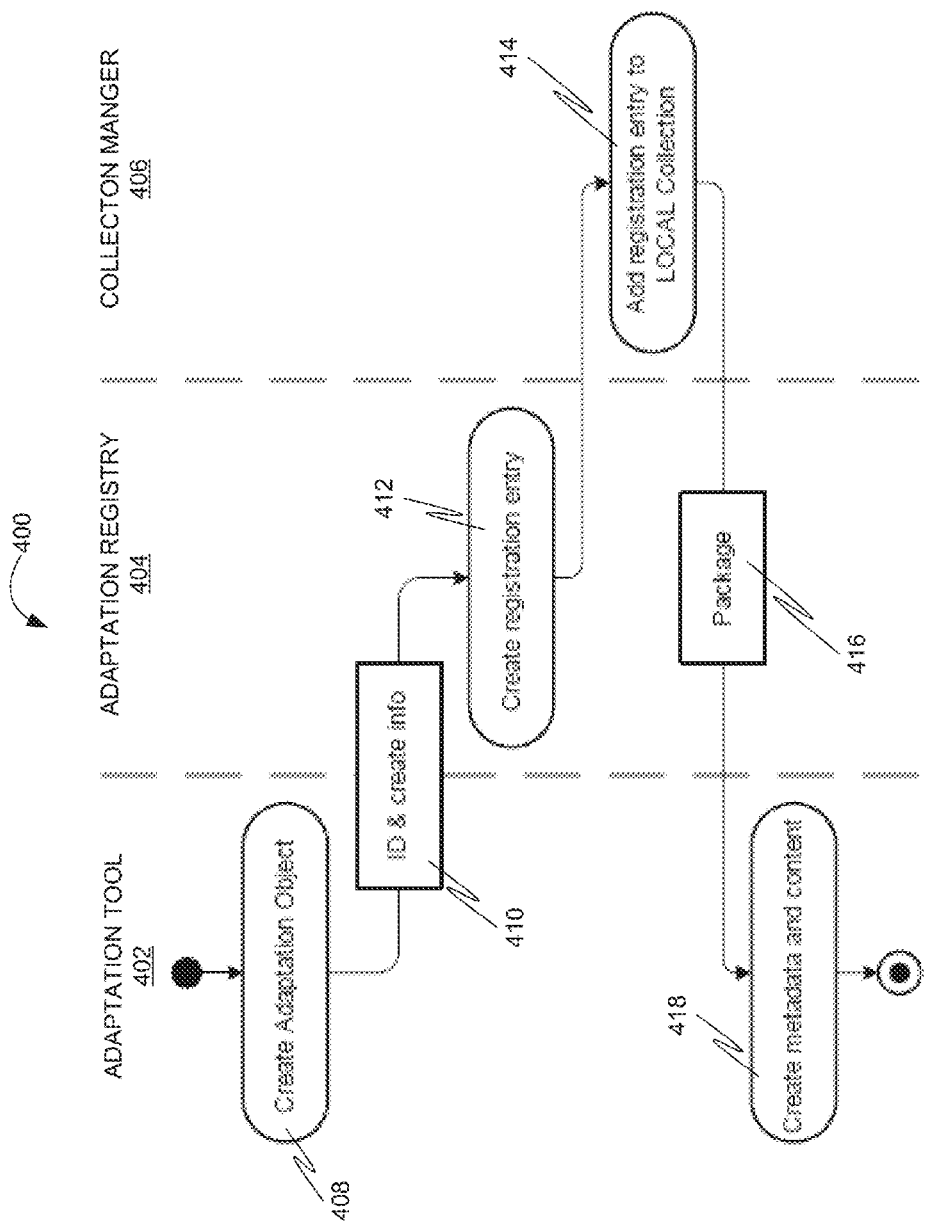
FIG. 4 is a ladder diagram illustrating a method, in accordance with an example embodiment, for creating, registering and collecting adaptation objects, in a test system, for import to a production system.

FIG. 4 is a ladder diagram illustrating a method 400, in accordance with an example embodiment, for creating, registering and collecting adaptation objects 314 in a test system 302 for import to a production system 304. This method can utilize an adaptation tool 402 (e.g., 312), an adaptation registry 404 (e.g., 328) and a collection manager 408 (e.g., 336) in the test system 302. A key user 306 may use the adaptation tool 402 to create an adaptation object 314 in a first step 408. In step 410, the adaptation tool 402 provides an adaptation object ID and descriptive information regarding the adaptation object 314 (e.g., semantic description of software extension) so that an entry for the adaptation object 314 can be created in the adaptation registry 404 in step 412. The adaptation tool 402 can therefore register the adaptation object 314 by calling the adaptation transport organizer 316 with the adaptation object 314, adaptation object description (in "key user language"), and the adaptation type of the adaptation object since the adaptation transport organizer 316 includes adaptation registry 328 of all existing adaptation objects 314 for a system. The adaptation transport organizer 316 will store the information with the description for this adaptation object 314 (e.g. so that the user interface can show this to a key user 306 instead of the ID). In step 414, the adaptation object is added to the LOCAL collection 332 by the collection manager 406. At a later point in time the key user 306 can reassign it to another NON-LOCAL (transportable) collection 332 using the adaptation transport organizer 316. The adaptation transport organizer 316 tells the adaptation tool 312 which development package (e.g., ABAP package 334) shall be used for the technical objects belonging to this adaptation object 314. The adaptation tool 312 then creates the metadata 324 and the transportable content 326 (e.g. technical objects).

In one implementation, broken references (e.g., call to unknown or non-existent objects) are handled differently depending on the circumstances. For instance, if a soft dependency is involved (e.g., a call to a custom field that might be selected by a business user 310) then the import of the transport request 344 including the calling adaptation object 314 will proceed but the user interface (UI) of the extended application 322 (extended by the calling adaptation object) may simply hide or disable the custom field. On the other hand, if a hard dependency is involved (e.g., a referenced field of a custom structure does not exist in the production system 304) the import of a transport request 344 that includes an adaptation object 314 that cannot be activated will simply fail. An index/where-used list of a repository information system can provide a basis for handling such dependencies. Such an index/where-used list may be set up for customer-specific objects (e.g., adaptation objects 314) and may be updated incrementally. For example, in the test system 302, the index can be updated immediately for every change to an adaptation object 314 by a key user 306, while, in the production system 304, the index may be generated and/or updated only after a transport request 344 is imported. In order to have a prompt update of the index, the adaptation transport organizer 316 may trigger the update job immediately after any import to the production system 304.

Dependency between adaptation objects 314 and other objects (e.g., other adaptation objects 314) is based on the business logic that calls for adaptation objects 314 to reference each other, e.g. via an identifier. In an implementation, the business logic can resolve broken references between transportable and non-transportable adaptation objects 314 in two different ways. Adaptation objects 314 can only be transported if they are no longer part of a local (non-transportable) collection 332. Therefore, before exporting an adaptation object 314 from test system 302, the adaptation transport organizer 316 can check that none of the transportable (non-local) objects (e.g. transportable content 326) references a local (non-transportable) object.

Figures 5A, 5B:
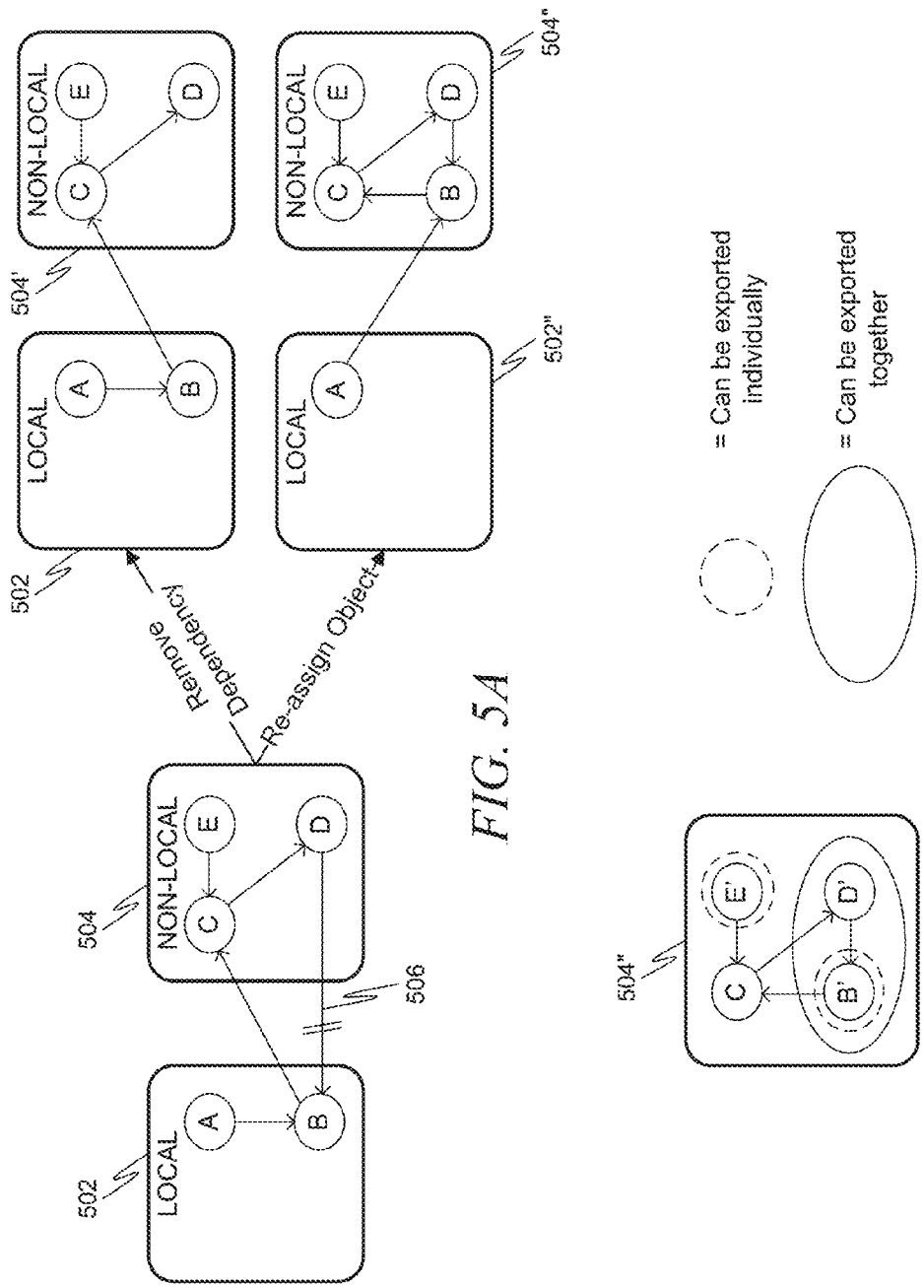
FIG. 5A is a diagram illustrating options for handling a dependency between an adaptation object in a non-local collection and an adaptation object in a local collection according to an example embodiment.
FIG. 5B is a diagram illustrating options for handling a dependency between a changed adaptation object in a non-local collection and an unchanged adaptation object in the same collection according to an example embodiment.

FIG. 5A is a diagram illustrating options for handling a dependency between an adaptation object D in a non-local collection 504 and an adaptation object B in a local collection 502 according to an example embodiment. A dependency (e.g., a call or reference) 506 between adaptation object D in non-local collection 502 (e.g., collection is designated for transport) and adaptation object B in local collection 502 is identified. In this situation, the user (e.g., key user 306 or project manager 308) may be presented with two choices (e.g., via the UI of the adaptation tool 312 or the UI of the adaptation transport organizer 316): removing the reference (e.g., dependency) from the adaptation object D to the adaptation object B so that local collection 502 remains unchanged and non-local collection 504 is modified to obtain non-local collection 504' by removing the call from adaptation object D to adaptation object B'; or assigning the referenced adaptation object B to the transportable non-local collection 504 to obtain modified local collection 502" and modified non-local collection 504".

FIG. 5B is a diagram illustrating options for handling a dependency between a changed adaptation object (B', D' and E') in a non-local collection 504 and an unchanged adaptation object C in the same collection 504" according to an example embodiment. Continuing with the example of re-assigning a dependency in FIG. 5A, once it has been assured that modified non-local collection 504" includes no references to any adaptation objects in a local collection, checks are performed to ensure that the adaptation objects (B, C, D and E) to be exported in collection 504" do not depend on (e.g., call or refer to) changes made to any of these objects by a key user 306 after the last export of the collection 504. If only unchanged adaptation objects (e.g., objects that have already been exported after the last change to the object) of collection 504" are to be exported, then no check is required since a check was already performed in a previous export of collection 504. If all of the objects that were changed since the last export of collection 504 are to be exported in collection 504", then no check is required either since the unchanged objects were checked before (e.g., previous export) and changed objects to be exported comprise all of the changes to the adaptation objects of collection 504" so that, if there are dependencies, then the dependencies are exported together.

However, if only a subset of all objects of collection 504" that were changed since the last export of collection 504 is to be exported, then a check is performed to determine that all dependent changes are included in the subset of adaptation objects to be exported. In FIG. 5B, adaptation objects that have been changed are B', D' and E', therefore adaptation objects E' and B' could be exported individually, since these objects do not depend on any changed object, e.g., they both depend only from unchanged adaptation object C. However, when the adaptation object D' is to be exported, then changed object B' will also be exported since object D' depends on changed object B'. Even if the changes made to B' may not, in fact, actually be relevant to any use of changed adaptation object B' by adaptation object D', this situation would require an export of all dependent parts of the adaptation object D' including changed adaptation object B'. The adaptation transport organizer 316 can provide a user with the option to export all changes (or a subset) since last export of a collection with an error message if there are any broken dependencies.

Figure 6:
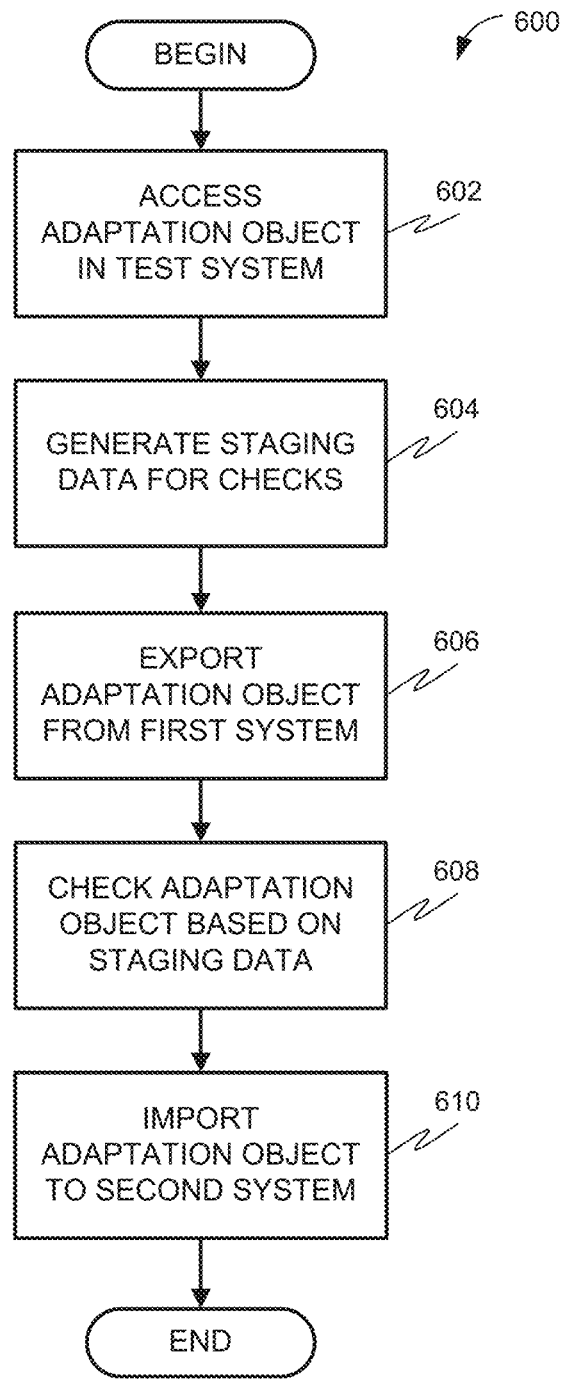
FIG. 6 is a flow diagram illustrating a method, in accordance with an example embodiment, for performing checks on a software extension during a staging phase prior to deployment.

FIG. 6 is a flow diagram illustrating a method 600, in accordance with an example embodiment, for performing checks on a software extension during a staging phase prior to import. Method 600 can be performed by processing logic that can comprise hardware (e.g., circuitry, dedicated logic, programmable logic, microcode, etc.), software (e.g., instructions run on a processing device), or a combination thereof.

At operation 602, an adaptation object 314 associated with an application 322 in a second system (e.g., production system 304) is accessed in a first system (e.g., test system 302). The adaptation object 314 comprises a semantic representation of a software extension for the application 322 (e.g., a short description easily understood by a key user 306 or project manager 308) and at least one software object, e.g., metadata 324 and further transportable content 326—including repository objects required for implementation of adaptation object 314 and at runtime of application 322. The accessing of an adaptation object 314 in the test system 302 may include a user (e.g., project manager 308) deciding to group adaptation objects 314 in a collection 332 for export from the test system 302 in the UI of an adaptation transport module (e.g., adaptation transport organizer 316). As mentioned above, a check is performed to determine if any software logistics locks have been set to prevent adaptations of the test system 302 and the production system 304 during maintenance e.g. hotfixes or upgrades. If there is no such lock in place, then the collection 332 may be set to a lock-status of "assembly-started" so that no new objects can be added to the collection 332, no objects can be removed from the collection 332 and no import of the same collection 332 can be done until assembly is finished.

The adaptation transport organizer 316 reads which adaptation objects 314 belong to the collection 332 and reads when the last export was done (in case of a delta export of only changed objects). The adaptation transport organizer 316 then calls, for each adaptation object 314 of the collection 332, the adaptation type in order to determine the object lists for the transport of the collection, e.g., determine the data needed by the change and transport system 318 to transport the collection. Finally the lock status would be reset from "assembly-started" when assembly is complete.

At operation 604 staging data (e.g., data used for checks performed on an adaptation object 314 during a staging phase 118) based on an adaptation type of the adaptation object 314 is generated. The adaptation transport organizer 316 uses the adaptation type of each adaptation object 314 to generate staging data for checks (e.g., checks 354) by examining the class structure of a class of the adaptation type (e.g., via a call to the class definition). As noted above, this data may be used to determine if an adaptation object 314 is active (e.g., still in use) or consistent (e.g., does not depend on missing objects), or to do any further checking that is needed.

The adaptation type data may be provided as staging data to the production system 304 via a manifest file 362 created after the successful export of the transport request 344 by the adaptation transport organizer 316, e.g., via export manager 350. The manifest file 362 also contains general information regarding the test system 302 (e.g., export system) at export time (e.g. release, software components, support package levels, full or delta transport, version number of the collection, . . . ) that can be used as staging data to perform checks in the production system 304 prior to import of the adaptations of collection 332.

At operation 606 the adaptation object 314 is exported from the test system 302 to the production system 304. Certain checks (e.g., checks 354) are performed before export of the collection 332 including the adaptation object 314. For each check that is failed, the relevant errors will be shown on the UI of the adaptation transport organizer 316. If all checks are successful (e.g., satisfied based on a comparison to reference data as explained above) a data file 360 based on the transport request 344 is placed into the transport directory 320 together with the manifest file 362. Alternatively, the manifest file 362 would not be a separate file, but instead the manifest data could be included in the data file 360. After the export of the transport request 344 an export history 358 would be updated and an export log 356 would be created based on the export and the transport request 344 would be added to the virtual import queue 346.

Before an import or check before import of the collection 332 can be done, the virtual import queue 346 is read e.g. by a batch job running at certain intervals or in background jobs when the import UI is started in production system 304. Such a background jobs will read for each transport request 344 found in the virtual import queue 346 the staging data (e.g. in the manifest file 362) the information about collection 332, such as collection name, collection version, full or delta changelist, adaptation objects 314 in the transport request 344 and it will transfer this information to the adaptation transport organizer 316 (in the production system 304). Then the project manager 308 can see the collection versions with the collection name, the full/delta information, the version information waiting for import in the UI of the adaptation transport organizer 316 (e.g., import manager 366 in the production system 304) and project manager 308 may select one collection version for import. Before the actual import is done, the checks as shown in operation 608 are performed. At operation 608, checks are performed on the adaptation object 314 based on the generated staging data. Certain checks (e.g., checks 354) are performed by the adaptation transport organizer 316 (e.g., via import manger 366) on the collection 332 including the adaptation object 314 at "import time" after the collection 332 has been exported from the test system 302, for example the checks may be performed in the production system 304 (before importation). The checks may be based on the adaptation type of the adaptation object 314, for example checks may be used to determine if the adaptation object 314 is active (e.g., still in use) or consistent (e.g., does not depend on missing objects), or to do any further checking that is needed. The results of the checks (e.g., too many failures) may impede the implementation of an adaptation (e.g., installation of software extension on application 322 of production system 304) and the errors will be represented on the UI of the adaptation transport organizer 316 in a manner that is understandable to the project manager 308, e.g. based on the semantic representation of the software extension from the adaptation object that failed the test. If all checks are successful (e.g., satisfied based on a comparison to reference data as explained above) the adaptations of the collection 332 will be imported in the production system 304 via the adaptation transport organizer 316 adding the transport (e.g., data file 360) to an import queue 348 of the transport directory 320 and removing it from the virtual import queue 346. The import may start immediately or at a designated time at the user's discretion. After the import of the adaptation objects 314 of collection 332 in the production system 304, the extended application 322 may be used by a business user 310.

Based on all the checks of operation 608 being successful, the actual import of collection 332 can begin. At operation 610, the adaptation object 314 is imported to the production system 304. The import process would look for the manifest file 362 and an error message could be presented if the manifest file 362 is corrupted or is missing. The import process will check for any software logistics locks (as explained above) and if any are in place, no import is allowed and the project manager 308 gets a notification to try again at a future time. If the import is allowed, the adaptation transport organizer 316 can set the lock-status of the collection to "import".

As noted above, the staging data may be used as a basis for checks performed by the adaptation transport organizer 316 (e.g., via import manger 366) prior to importation of collection 332. In this situation the adaptation transport organizer 316 will read the manifest file 362 and do some general checks (e.g. if this is a delta transport with version 7 and the second (e.g., production) system only has version 5 of this collection, then version 7 delta cannot be imported, until version 6 is imported). If these general checks are successful, the adaptation transport organizer 316 reads from the manifest file 362 which adaptation objects 314 exist in the transport and which adaptation types they belong to and the dependency information for each of them. Then the adaptation transport organizer 316 calls the adaptation types with this dependency information and collects the results. After the import of the transport request 344 an import history 370 would be updated and an import log 372 would be created based on the import.

Figure 7:
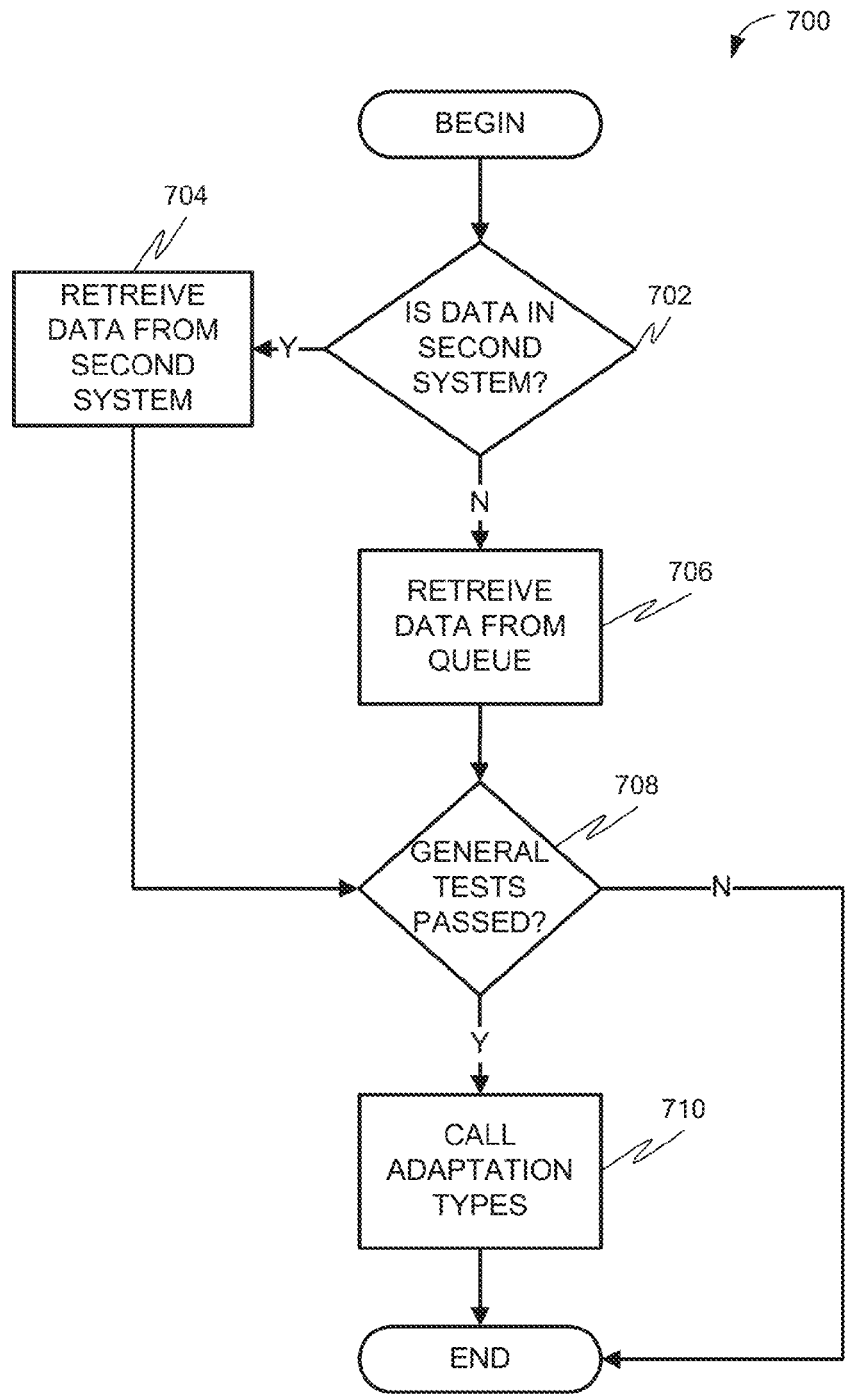
FIG. 7 is a flow diagram illustrating a method, in accordance with an example embodiment, for performing checks on a software extension during a staging phase prior to deployment.

FIG. 7 is a flow diagram illustrating a method 700, in accordance with an example embodiment, for performing checks on a software extension during a staging phase prior to implementation. Method 700 can be performed by processing logic that can comprise hardware (e.g., circuitry, dedicated logic, programmable logic, microcode, etc.), software (e.g., instructions run on a processing device), or a combination thereof. At operation 702 the adaptation transport organizer 316 determines whether the staging data necessary for an "importation time" check prior to import is already in the production system 304. As noted above, the information in the manifest file 362 may simply be included in the data file 360 transporting the adaptation object 314 in a collection 332. If it is determined that the needed staging data is present in the production system (e.g., in internal tables of the adaptation transport organizer 316 in production system 304), then at operation 704 the staging data is read from the production system 304 and the method continues to operation 708. If it is determined that the staging data is not in the production system 304 then, at operation 706, the adaptation transport organizer 316 retrieves the manifest file 362 for the transport request 344 in the virtual import queue 346 because the manifest file 362 contains general information regarding the test system 302 (e.g., export system) at export time (e.g. release, software components, support package levels, full or delta transport, version number of the collection, . . . ) that can be used as staging data to perform general checks in the production system 304 prior to import of the adaptations of collection 332.

At operation 708 it is determined whether all of the general tests based on the general data from the manifest file 362 have been passed. If these general checks are not successful then the method ends and the collection 332 is not imported. If these general checks are successful, at operation 710 the adaptation transport organizer 316 reads from the manifest file 362 which adaptation objects 314 are present, which adaptation types they belong to and the dependency information for each of the present adaptation objects 314 in the collection 332. Then the adaptation transport organizer 316 calls the adaptation types with this dependency information and collects the results of checks by the adaptation types.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other example embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments can be implemented in digital electronic circuitry, or in computer hardware, firmware, software, or combinations of these. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware can be a design choice. Below are set out hardware (e.g., machine) and software architectures that can be deployed, in various example embodiments.

Machine Architecture and Machine-Readable Medium

Figure 8:
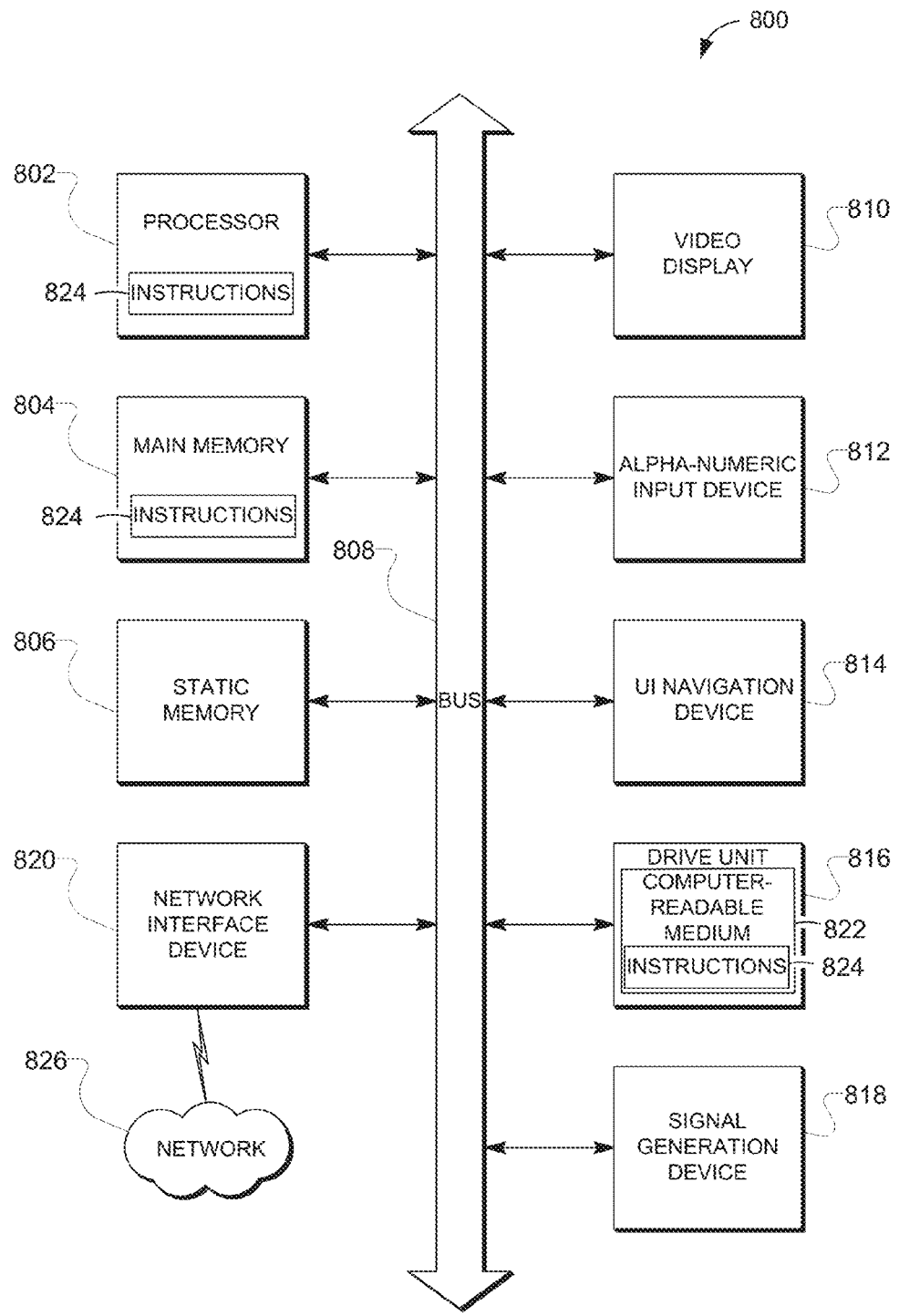
FIG. 8 is a block diagram of a machine in the example form of a computer system within which instructions for causing the machine to perform any one or more of the methodologies discussed herein can be executed.

FIG. 8 is a block diagram of a machine in the example form of a computer system 800 within which instructions for causing the machine to perform any one or more of the methodologies discussed herein can be executed. In alternative embodiments, the machine can operate as a stand-alone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 can further include a video display unit 810 (e.g., a liquid crystal display (LCD) or a cathode ray tube (CRT)). The computer system 800 can also include an alpha-numeric input device 812 (e.g., a keyboard or a touch-sensitive display screen), a user interface (UI) navigation device 814 (e.g., a mouse), a drive unit 816, a signal generation device 818 (e.g., a speaker), and a network interface device 820.

Machine-Readable Medium

The disk drive unit 816 includes a computer-readable medium 822 on which is stored one or more sets of instructions and data structures (e.g., software) 824 embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" can include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method comprising:
    accessing, in a first system, a collection of adaptation objects associated with an application in a second system, each adaptation object of the collection of adaptation objects comprising a semantic representation of a software extension for the application and at least one associated software object, wherein each adaptation object of the collection of adaptation objects is designated as a transportable object;
    generating staging data based on an adaptation type of each of the adaptation objects of the collection of the first system;
    exporting the collection from the first system;
    performing checks on each of the adaptation objects of the collection based on the staging data, the checks comprising at least checking each adaptation object of the collection of adaptation objects to determine whether the adaptation object of the collection of adaptation objects depends upon an adaptation object that is designated as a non-transportable object, and wherein a dependency between the adaptation object of the collection of adaptation objects and an adaptation object that is designated as a non-transportable object is handled by either removing the dependency from the adaptation object of the collection of adaptation objects to the adaptation object that is designated as a non-transportable object or reassigning the adaptation object that is designated as a non-transportable object to the collection of adaptation objects;
    importing the collection to the second system; and
    installing each of the software extensions on the application using the at least one associated software object based on a comparison of the results of the checks of each respective adaptation object to reference data associated with the adaptation type of the respective adaptation object.

2. The method of claim 1, further comprising:
    for each failed check: generating an error message using the respective semantic representation of the software extension from the adaptation object that failed the check.

3. The method of claim 1, wherein generating the staging data comprises creating a file including the staging data in a transport directory shared by the first system and the second system.

4. The method of claim 1, wherein exporting the collection from the first system comprises creating a file including the staging data in the second system.

5. The method of claim 1, wherein the checks are performed in the second system.

6. The method of claim 1, wherein generating staging data based on an adaptation type of the adaptation object comprises a call-back to a class associated with the adaptation type of the adaptation object.

7. The method of claim 1, wherein the checks include a check to determine that installing the software extension of a first adaptation object of the collection on the application includes first installing the software extension of a second adaptation object of the collection on the application.

8. The method of claim 1, wherein the checks include a check to determine that the collection includes a first adaptation object that references a second adaptation object that is not part of the collection or that has not previously been imported to the second system.

9. A system comprising:
    a storage;
    an enterprise system;
    a test system including adaptation objects for applications of the enterprise system; and
    an adaptation transport module executable by a processor and configured to perform operations comprising:
    accessing, in the test system, a collection of adaptation objects associated with an application in the enterprise system, each adaptation object of the collection of adaptation objects comprising a semantic representation of a software extension for the application and at least one associated software object, wherein each adaptation object of the collection of adaptation objects is designated as a transportable object;
    generating staging data based on an adaptation type of each of the adaptation objects of the collection;
    exporting the collection from the test system;
    performing checks on each of the adaptation objects of the collection based on the staging data, the checks comprising at least checking each adaptation object of the collection of adaptation objects to determine whether the adaptation object of the collection of adaptation objects depends upon an adaptation object that is designated as a non-transportable object, and wherein a dependency between the adaptation object of the collection of adaptation objects and an adaptation object that is designated as a non-transportable object is handled by either removing the dependency from the adaptation object of the collection of adaptation objects to the adaptation object that is designated as a non-transportable object or reassigning the adaptation object that is designated as a non-transportable object to the collection of adaptation objects;
    importing the collection to the enterprise system; and
    installing each of the software extensions on the application using the at least one associated software object based on a comparison of the results of the checks of each respective adaptation object to reference data associated with the adaptation type of the respective adaptation object.

10. The system of claim 9, wherein the adaptation transport module is further configured to perform operations comprising:
for each failed check: generating an error message using the respective semantic representation of the software extension from the adaptation object that failed the check.

11. The system of claim 9, wherein the adaptation transport module is further configured to perform operations comprising:
generating the staging data by creating a file including the staging data in a transport directory shared by the test system and the enterprise system.

12. The system of claim 9, wherein the adaptation transport module is further configured to perform operations comprising:
generating the staging data by creating a file including the staging data in the enterprise system.

13. The system of claim 9, wherein the adaptation transport module is further configured to perform operations comprising:
generating the staging data based on an adaptation type of the adaptation object by using a call-back to a class associated with the adaptation type of the adaptation object.

14. The system of claim 9, wherein the checks include a check to determine that installing the software extension of a first adaptation object of the collection on the application includes first installing the software extension of a second adaptation object of the collection on the application.

15. The system of claim 9, wherein the checks include a check to determine that the collection includes a first adaptation object that references a second adaptation object that is not part of the collection or that has not previously been imported to the second system.

16. A non-transitory machine-readable storage medium comprising instructions, which when implemented by machines, cause the machines to perform operations comprising:
accessing, in a first system, a collection of adaptation objects associated with an application in a second system, each adaptation object of the collection of adaptation objects comprising a semantic representation of a software extension for the application and at least one associated software object, wherein each adaptation object of the collection of adaptation objects is designated as a transportable object;
generating staging data based on an adaptation type of each of the adaptation objects of the collection;
exporting the collection from the first system;
performing checks on each of the adaptation objects of the collection based on the staging data, the checks comprising at least checking each adaptation object of the collection of adaptation objects to determine whether the adaptation object of the collection of adaptation objects depends upon an adaptation object that is designated as a non-transportable object, and wherein a dependency between the adaptation object of the collection of adaptation objects and an adaptation object that is designated as a non-transportable object is handled by either removing the dependency from the adaptation object of the collection of adaptation objects to the adaptation object that is designated as a non-transportable object or reassigning the adaptation object that is designated as a non-transportable object to the collection of adaptation objects;
importing the collection to the second system; and
installing each of the software extensions on the application using the at least one associated software object based on a comparison of the results of the checks of each respective adaptation object to reference data associated with the adaptation type of the respective adaptation object.

17. The storage medium of claim 16, the operations further comprising:
for each failed check: generating an error message using the respective semantic representation of the software extension from the adaptation object that failed the check.

18. The storage medium of claim 16, wherein generating the staging data comprises creating a file including the staging data in a transport directory shared by the first system and the second system.

19. The storage medium of claim 16, wherein the checks include a check to determine that installing the software extension of a first adaptation object of the collection on the application includes first installing the software extension of a second adaptation object of the collection on the application.

20. The storage medium of claim 16, wherein the checks include a check to determine that the collection includes a first adaptation object that references a second adaptation object that is not part of the collection or that has not previously been imported to the second system.

* * * * *